Dec. 2, 1952  I. A. WILLIAMS  2,619,855
MATERIAL UNITING PUNCH AND DIE
Filed May 20, 1947  2 SHEETS—SHEET 1
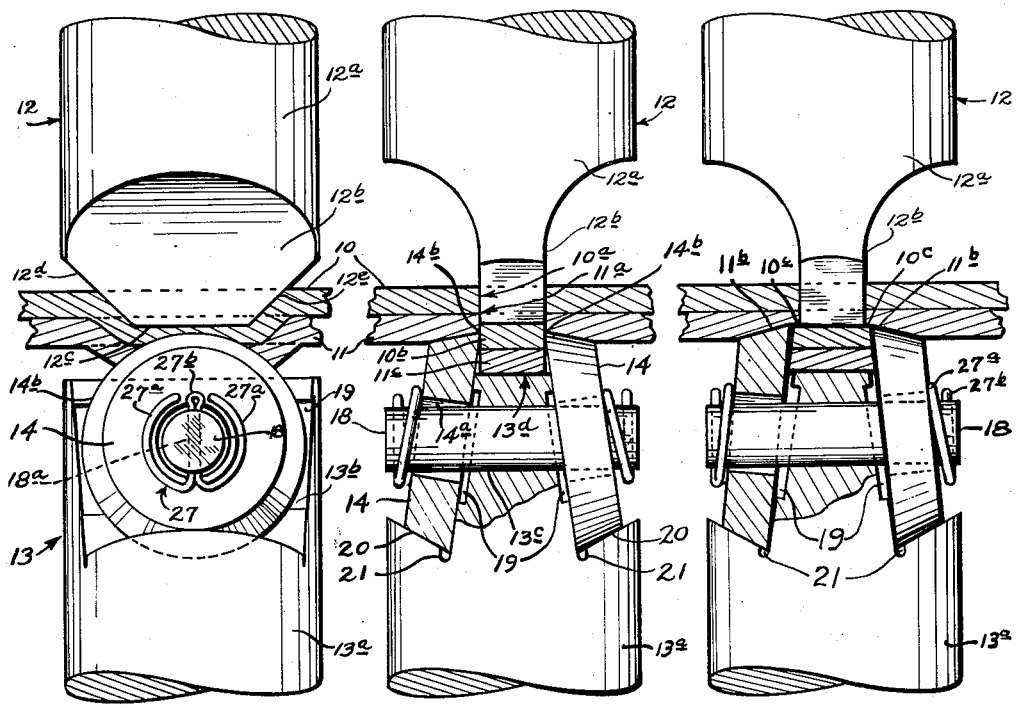
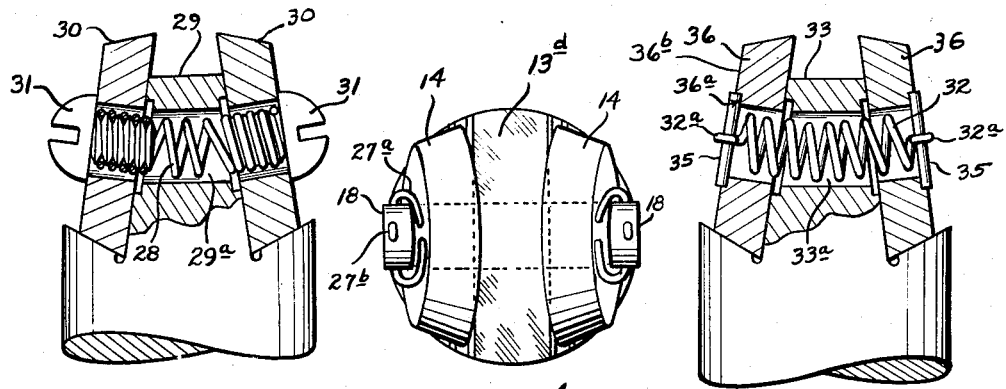
INVENTOR.
Ivan A. Williams
BY Eugene D. Farley
Atty.

Dec. 2, 1952  I. A. WILLIAMS  2,619,855
MATERIAL UNITING PUNCH AND DIE
Filed May 20, 1947  2 SHEETS—SHEET 2

INVENTOR.
Ivan A. Williams
BY
Atty.

Patented Dec. 2, 1952

2,619,855

UNITED STATES PATENT OFFICE 2,619,855

MATERIAL UNITING PUNCH AND DIE

Ivan A. Williams, Portland, Oreg.

Application May 20, 1947, Serial No. 749,377

4 Claims. (Cl. 78—1)

This invention relates broadly to the uniting of materials. More specifically, the invention pertains to a method for uniting superimposed pieces of material; to a novel die for use in the practice of such method; and to a novel fastening element formed as a product of the practice of such method.

Many methods heretofore have been practiced for uniting pieces of material, particularly metal sheets. Such methods include overlapping portions of the material to be joined and fastening them together by means of bolts, screws, rivets, spot welds and the like. An alternate method is disclosed and claimed in my United States Letters Patent No. 2,254,558, issued September 2, 1941, for Fastening Elements and Method of Making Same, and in my United States Letters Patent No. 2,288,308, issued June 30, 1942, for Punch and Die. In accordance with the method disclosed in these patents, superimposed pieces of material are placed between a punch and die in a press assembly. The punch and die are then caused to approach each other so that their cutting edges coact to form spaced incisions entirely through the superimposed pieces of material. The sections of material between between the incisions are deformed in the direction of the anvil element of the die assembly until substantial portions lie entirely beyond the plane of that surface which is adjacent the die. The deformation of the material between the spaced incisions is accompanied by bending and stretching portions of the material in the end zones between and near the spaced incisions in a pattern conforming to the shape of the punch. The central sections of the deformed portions are then subjected to pressure against the anvil of the die with the result that they are extruded laterally. There are thus formed laterally extending keys which span the incisions and engage the undisplaced material on each side thereof, preventing retraction of the deformed material through the opening between the incisions. As a result, the pieces of material are locked together securely. I speak of the above method as "stitching" and the novel fastening elements formed by practicing the method as "stitches." It is toward an improved method for thus stitching together pieces of material, particularly metal sheets, and toward means for practicing this method that the present invention is directed.

It is the general object of the invention to provide a method and means for rapidly, efficiently, economically and securely uniting a plurality of pieces of material.

A further object is to provide fastening elements which are relatively inconspicuous and extend a minimum distance beyond the planes of the surfaces of metal sheets or other materials united thereby.

A further object is to provide a fastener which, in contradistinction to bolts, rivets, screws and the like, does not present a major obstruction to the passage of a saw or other cutting implement through the materials after the pieces thereof have been united.

A further object is to provide a die which is self-cleaning and which will not become fouled or clogged when applied to coated material such as galvanized iron, or to articles having surfaces on which are present particles of scale and the like.

A further object is to provide a die having a multiplicity of cutting edges which automatically presents new cutting edges to the surface of the material operated upon.

A further object is to provide a die having laterally yielding or resiliently mounted cutting edges.

A further object is the provision of a die which will cooperate with a punch in such a manner as to form recesses or indentations in the surface of the material adjacent the die, these recesses lying immediately outside of the spaced incisions piercing the material.

A further object is to provide a die wherein provision is made for minimizing the dulling of the cutting edges thereof.

The manner in which these and other objects of the invention are accomplished will be apparent from a consideration of the following description taken together with the drawings wherein:

Fig. 1 is a composite side view of the herein described punch and die positioned in the throat of a press and operating on superimposed pieces of material to form a fastening element therebetween.

Fig. 2 is an edge view, partly in section, of the herein described punch and die as viewed in the throat of a press, illustrating the initial stage of the formation of a fastening element or a stitch extending through overlying pieces of material.

Fig. 3 is a view similar to that shown in Fig. 2, but indicating more advanced positions of punch and die and illustrating the final stages of the formation of the fastening element.

Fig. 4 is a plan view of the die assembly shown in Figs. 1, 2 and 3.

Figs. 5 and 6 are side elevations partly in section illustrating modifications in the means for attaching cutting members to the body of the die.

Figure 7:
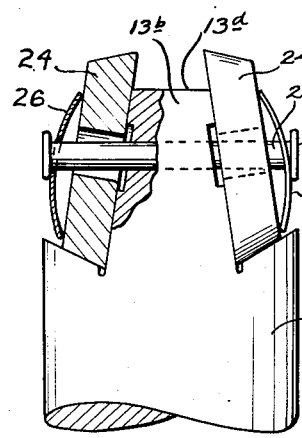
Figs. 7, 8 and 10 are side elevations, partly in section, illustrating dies having body or anvil portions of alternate form.

In the figures, overlying portions of pieces of material to be united are represented generally by the numerals 10 and 11. These are shown as they are arranged in position in the throat of a suitable press mechanism and are being operated upon by punch and die units represented generally at 12 and 13, respectively. The punch, or male member of the assembly, may be of various sizes and shapes but, as illustrated, comprises a body section 12a and a cutting portion 12b. The cutting portion advantageously may be semi-hexagonal in shape, as viewed from the side (Figure 1), so as to present three surfaces to the material operated upon. Although these surfaces normally are flat, they may assume other forms if required by the needs of a particular operation. The center surface 12c, which first comes in contact with the material, is sufficiently long to produce a stitch of the desired length and is sufficiently wide to correspond to the distance between the cutting members of the die with which it cooperates. The coaction of the side edges of the center portion of the punch with the cutting members of the die is primarily reponsible for the shearing action required to form spaced incisions through the material, which is one operation of the sequence producing the final fastening element or stitch.

The edge surfaces 12d and 12e of the punch are positioned initially in registry with the open ends of the die. They act primarily as forming members for bending or deforming and stretching the material between the spaced incisions produced by the punch and die. Since the bending occurs over a substantial area when using a punch of the form illustrated, there is avoided localized stretching and thinning of the material and consequent weakening of the stitch.

Figure 10:
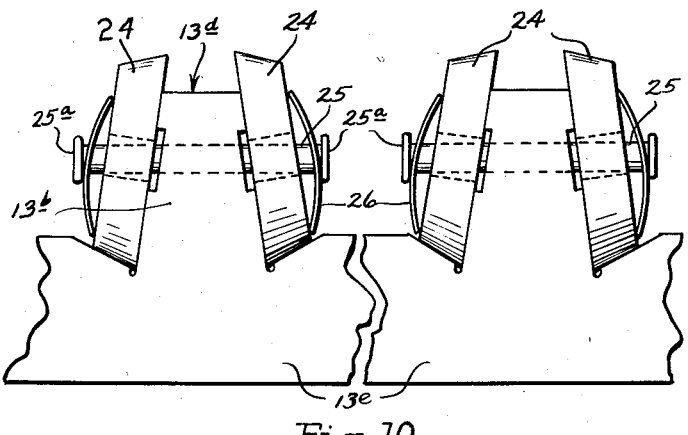

The die or female member 13 of the assembly comprises a body portion 13a, a transversely apertured anvil portion 13b, and a plurality of transversely perforated cutting members 14. The body portion of the die may assume various forms to meet the needs of various types of operations. In many applications, it may comprise an elongated member, preferably circular in cross section, having a terminal portion reduced in size to form a projection or neck which serves as the anvil surface 13d of the die. Dies having body portions of this general character are illustrated in Figs. 1–9, and 11. Alternately, however, the body portion of the die may comprise a member 13e from which one or more anvil portions extend transversely, as is illustrated in Fig. 10. Such a construction is particularly useful where it is desired to make a plurality of stitches in one operation.

The anvil portion of the die has opposed side faces against which the cutting elements bear, and is transversely apertured to provide an opening 13c which is in substantial registration with the perforations 14a in the cutter. As will appear more fully hereinafter, this provides a construction for attaching the cutting elements to the die rotatably in the plane of their cutting edges and yieldably laterally with respect to the anvil.

The anvil portion preferably is wider at its base than at its top, thereby to provide opposed, converging plane side faces. This will result in imparting a similar degree of convergence to the cutting elements, the side faces of which bear against the converging side faces of the anvil. Although the degree of convergence is variable, if present at all, it preferably is that produced by having the side faces of the anvil inclining toward the top at an angle of about six degrees from the median line through the base of the anvil. This converging construction is preferred because it provides an anvil surface which is relatively wide with respect to the distance between the cutting edges of the cutters and the width of the punch. Use of such an anvil facilitates the formation of a strong fastening element and inhibits the necking down or bending of the material about the edges of the anvil.

Figure 8:
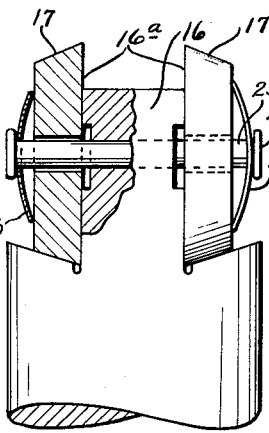
Figure 9:
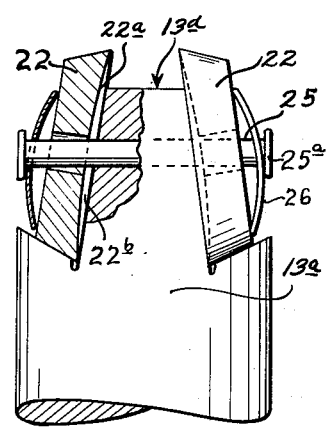
Fig. 9 is a side elevation, partly in section, illustrating a modified form of cutting element.

However, if desirable for a given application, one or both of the opposite side faces of the anvil and hence the cutters adjacent thereto, may be substantially parallel to the longitudinal dimension of the anvil rather than converging. Such constructions are illustrated in Figure 8, wherein both of the side faces 16a of the anvil 16 are thus parallel, and in Figure 11. In the construction of the latter figure, which is particularly suitable for use where it is desired to insert fastening elements in corners or other positions difficult of access, one side surface 15b of the anvil 15a of the die body 15 is parallel to the longitudinal dimension thereof, while the opposite side face 15c is oblique with respect thereto. Hence it is possible to position the die with the outside face of one cutting element lying substantially flush against a side wall of the material operated upon and in this manner produce a stitch or fastening element close to an edge or a corner.

When operating on non-scaling materials, the anvil may have plane opposed side faces adapted to bear against the entire side surface area of the cutting elements. The die of Figure 11, referred to above, has such an anvil. However, when the die is to be used upon coated metals such as galvanized iron or upon materials having particles of scale on their surfaces or upon materials which tend to disintegrate, it is desirable to provide means for accommodating and disposing of particles of refuse material which otherwise might collect upon and interfere with the action of the die. As is illustrated in Figs. 1–3 and 5–8, such means may comprise recesses or cavities 19 extending transversely across opposite side faces of the anvil and adjacent the inner side faces of the cutting elements. These recesses accommodate particles of scale, coating material and the like formed during operation of the die and prevent such particles from disturbing the position of the cutters and the close fit between the cutting edges of the punch and those of the die. Elimination of the refuse particles from the recesses is facilitated by frictional contact of the particles with the inner faces of the cutters, which may be rotated during operation of the press to eject the accumulated particles.

Protection of the weaker elements of the die structure in order to prevent injury occasioned by operating stresses is afforded by the location of shoulders 20 in the body portion of the die adjacent the opposite side faces of the anvil. These shoulders slope inwardly toward the center of the body portion and serve as supporting surfaces for the peripheries of the cutters so that the crushing and displacing stresses developed during operation of the apparatus are resisted by the body portion of the die. As a result, the weaker members of the die assembly, particularly the spring assembly holding the cutting elements in place, are protected from damage.

Provision also is made for protecting the cutting edges of the die. Located in or next to each of the shoulders are recesses or cavities 21. In the form shown, these comprise grooves running along the base at each of the oppositely disposed faces of the anvil portion so that they underlie the cutting edges of the cutting elements. When the latter are forced against the shoulders during operation of the press, the cutting edges lie within the grooves which serve as reliefs to protect them from contact with the body portion of the die.

Figure 12:
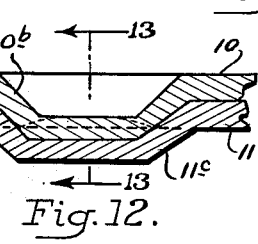
Fig. 12 is a section taken longitudinally through the middle of a stitch or fastening element formed in accordance with my invention, taken on the line 12—12 in Fig. 13.
Figure 13:
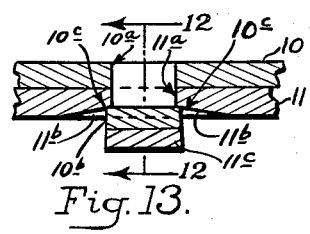
Fig. 13 is a transverse section through the middle of a stitch formed by practice of the herein disclosed method, taken on the line 13—13 in Fig. 12.

Held adjacent the recessed side faces of the anvil portion of the die are the cutting members or "cutters" 14. These may comprise disc-shaped elements having centrally located transverse apertures. The edges of the cutters preferably are beveled to form cutting edges 14b which actively cooperate with the cutting edges of the punch to form spaced incisions 10a—11a extending through overlying portions of the pieces of material 10—11 to be united (Figs. 12 and 13). They also act to form recesses or indentations 11b lying immediately outside the incisions 10a—11a, these recesses being formed in the surface of the piece 11 which is adjacent the die assembly 13.

Various degrees of bevel may be present on the edges 14b of the cutting elements. In general, the bevelling should be such that a desired cutting edge is present and indentations 11b of a desired size and shape are formed, without being so great as to oppose unduly the lateral displacement of the cutting elements during formation of the stitch.

The cutting elements preferably are circular or disc-shaped. Their inner faces, i. e. the faces opposing the side faces of the anvil, usually are flat, but they also may be in other forms. For example, it may be desirable to have the inner face 22a of cutters 22 concave in form or recessed (see Fig. 9), so that when they bear against the side faces of the anvil, there will be present recesses between the anvil and the cutters. Such recesses 22b will serve a function similar to that served by recesses or cavities 19—19 cut in the side faces of an anvil, discussed hereinabove, and will accommodate particles of refuse material produced during the operation of the die.

A preferred means for securing the rotatable and yieldable attachment of the cutting members to the anvil is by the use of a pin assembly, which may or may not include spring elements. As previously has been indicated, the anvil portion 13b of the die 13 is apertured transversely to provide access for the pin or shaft 18, in the embodiment illustrated in Figs. 1 to 4, inclusive. The pin extends outwardly from both sides of the anvil 13b a distance sufficient to serve as an axle for the cutters 14, one of which is attached to each end of the pin. The cross sectional dimension of the pin with relation to the size of the transverse apertures in the anvil and cutting elements is such that the pin fits snugly within the aperture through the anvil, but loosely within the apertures in the cutting elements. A close fit between pin and anvil is desirable to give increased strength to the assembly, since the body of the pin acts to support the top portion of the anvil which receives the full force of the impact with the punch. This should be a sliding fit in constructions such as that of Figure 11, however, to permit proper functioning of the single spring contained therein.

On the other hand, a loose fit between the pin and the cutters is desired to enable the cutters to slip up and down to a limited extent over the side faces of the anvil. Sufficient play should be present so that when the cutters oppose a surface of the material being united, they do not press upon the shaft on which they are mounted to exert a shearing action thereon. Rather, they are displaced downwardly sufficiently so that they contact the shoulders in the body portion of the die, which thus resist the force of the punching operation.

As is illustrated in Fig. 7, the cutting elements 24 may be held upon the pin 25 by simply riveting or otherwise deforming the ends 25a of the pin so that the cutting elements are held in place. Since space is present between the riveted ends of the pin and the side faces of the cutters, the cutters are free to move laterally to a limited extent. After such lateral movement, however, they will be moved back against the side faces of the anvil by the spring washers 26 or other resilient means for exerting pressure against the side faces of the cutting elements. Such spring action must be controlled. If not sufficiently strong, the cutters may not be held normally firmly against the anvil faces. However, if the spring is too strong, it will tend to oppose lateral displacement of the cutting elements and thus interfere with or prevent proper functioning of the die.

Another form of spring means for holding the cutters against the anvil is illustrated in Figs. 1, 2, 3 and 4. As is illustrated, these elements, indicated at 27, comprise E-shaped pieces of spring wire or other material of such proportions that the outside arms 27a of the spring can distort and thus slip around the periphery of the shaft 18 while the intermediate arm 27b may be inserted endwise into an opening 18a, usually a diametrically disposed opening, in the end of the shaft. Preferably they are so placed that the outside arms 27a extend in the direction of the material being operated upon by the die. This insures maximum springing effect and maximum flexibility in that portion of the cutting element which is in active use. It is to be noted further that the spring action of the outside arms 27a of the spring member is augmented and reinforced by the resistance to torque of the intermediate arm extending through the aperture 18a in the shaft 18. There is thus provided a spring which is compact, simple to make and install, and one which holds the cutting disc closely against the side faces of the anvil portion of the die.

An alternate construction for rotatably and yieldably attaching the cutters to the die is illustrated in Fig. 5. In this construction, a helical spring 28, rather than pin 18 of the foregoing embodiment, extends through the aperture 29a in the anvil 29 and cutters 30. It is held in place by bolts or screws 31. These have diameters and thread spacings such that they may be screwed within the open ends of the spring 28. When thus in place, frictional engagement of the threads of the screws with the turns of the spring prevents the working loose or retraction of the screws. As a result, the spring member and cutting elements are held firmly in place under the desired tension.

Still another modification of die structure is illustrated in Fig. 6. In this embodiment, the spring means employed for yieldably and rotatably mounting the cutting elements against the side faces of the anvil comprises a helical spring 32 positioned within the cavity 33a extending transversely through the body of the anvil 33 and extending outwardly at the ends a sufficient distance substantially to traverse the transverse openings in the centers of the cutting elements. Means are present on either end of the helical spring for securing the end of the spring to or against the cutting members. Such means conveniently may comprise semicircular terminal portions or loops 32a formed integrally with the spring. Passing through these terminal portions are pins or rods 35, which are of a length greater than the diameter of the transverse openings through the cutters. As a result, the spring, as it lies within the cavities in the anvil and cutters, may be stretched sufficiently to cause a desired tension to be exerted upon the pin elements 35. This tension is transmitted against the faces of the cutting elements to hold them yieldably in position and free to rotate and also to hold in place the pins or rods 35. This desired result is further assured by embedding the latter members to a greater or lesser degree in recesses 36a located on the outer surfaces 36b of the cutters 36.

It is to be noted that in the modification illustrated in Figs. 5 and 6, wherein helical springs are substituted for the shaft and spring members illustrated in Figs. 1, 2, 3 and 4, that there is sufficient play between the helical springs and the cutting members so that the thrust exerted against the cutting members during operation of the press will produce a slight displacement of the cutting members toward the body of the die without causing a shearing action to be exerted upon the spring members. As a result, this force may be resisted almost in its entirety by the shoulder portions of the body of the die upon which the cutters bear when they are thus displaced.

Figure 11:
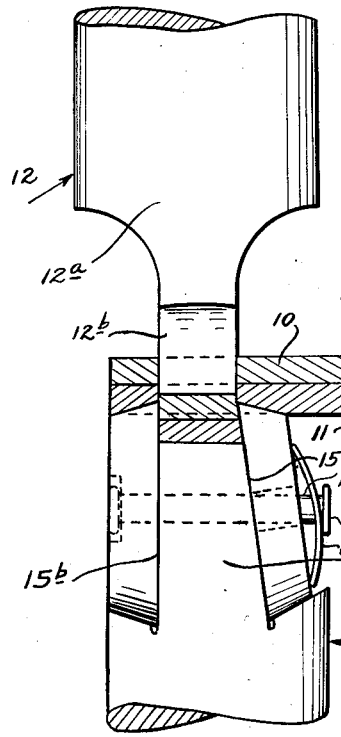
Fig. 11 is a side elevation, partly in section, of a modified die suitable for use when operating in corners and embodying a modified body portion and also alternate means for attaching the cutting members.

Although in the constructions described above spring pressure is applied directly to both of the cutters, for some purposes, as when using the apparatus in a corner where space is limited, it may be desirable to apply spring pressure directly to one of the cutters only. Such a construction is illustrated in Figure 11. In this embodiment, the cutters are mounted on opposed side faces of the anvil, one of the cutters preferably being subtsantially parallel to the longitudinal axis of the die and the other slightly inclined with respect thereto as described above. Both of the cutters and the anvil are apertured transversely to provide access to the shaft, there being a sliding fit between the shaft and the aperture in the anvil. Attached to the shaft is a single spring, as the spring washer 26, applied against the outer face of the inclined cutter, this being the cutter farthest removed from the corner. It will be apparent that the pressure exerted by this spring not only holds the inclined cutter yieldably against the anvil, but by means of pressure transmitted through the shaft, also holds the other cutter yieldably against the opposite side of the anvil. In this manner, both of the cutters are mounted yieldably in a lateral direction without providing a bulky spring on the side adjacent the corner.

In operation, the punch and die members may be mounted in a press mechanism. The punch may be positioned either above or below the die, or the two members may be arranged horizontally or obliquely. Either punch or die, or both, may be the movable portions of the assembly. These factors are variable to suit the requirements of the stitching operation. It is usually preferred, however, to have the die as the lower, stationary member and the punch as the upper, movable member so that upon actuation it descends toward the anvil.

It will further be apparent that a single punch and die may be used to produce a single stitch by a single operation, or a plurality of punches and dies may be mounted on a common member 13e (see Fig. 10) in the press, so as to produce a corresponding number of stitches in one operation.

In any of the foregoing types of punch and die installations, or modifications thereof, the punch and die elements are moved toward each other so that their cutting edges coact to form spaced incisions 10a—11a through overlying portions of the material 10—11 operated upon. In addition, pressure exerted by the beveled cutting edges of the die indents a surface of the material to form recesses or indentations 11b lying immediately outside of the spaced incisions 10a—11a. Deformation of the material 10b—11c between the incisions in the direction of the anvil of the die also occurs to such an extent that it is displaced beyond the plane of the inner surfaces or ceiling of the indentations 11b formed by the action of the beveled cutting edges of the die. During the displacing action, portions of the material are bent and stretched toward the die in a pattern conforming to the central surface 12c and the sloping side surfaces 12d—12e of the punch.

Further approach of punch and die causes compression against the anvil of the die of the deformed material with the result that it is expanded or extruded in a lateral direction with respect to the anvil. Since the anvil is relatively wide with respect to the punch, extrusion follows the general plane of the anvil without bending substantially about the sides thereof. There are thus formed laterally extending keys 10c which lie partly within indentations or recesses 11b beneath the edges of the incisions 11a, engaging these edges in such a manner as to prevent retraction of the deformed material through the space between the incisions. This forms a fastening element or stitch (Figs. 12 and 13) which serves to unite the overlying pieces of material and in which is obtained maximum locking effect with minimum displacement of material.

The lateral extrusion of the displaced material obviously causes the exertion of pressure against the inner faces of the cutting elements of the die. These are yieldably mounted, however, and spread to accommodate the lateral flow of the expanded material and to permit retraction of the finished fastener from the die.

Another effect occurring during operation of the assembly is the axial displacement of the cutting elements with respect to the anvil so that their edge surfaces rest upon the shoulder portions of the body of the die. The operating stresses developed in the punch and die are thus transmitted to the stronger section of the die assembly.

A further action is the successive presentation of fresh cutting edges of the cutter elements to the material operated upon. The cutters are rotatably mounted on the die and their rotation is induced by removal of the stitched material from the press. There thus is made available a multiplicity of cutting edges which may be presented successively to the surface of the material operated upon. This obviously greatly prolongs the life of the die. The retention of a sharp cutting edge is also made possible by reason of the fact that, although the edge portions of the cutting elements are displaced downwardly against the shoulders of the body portion of the die during operation of the press, the cutting edges are protected during this action by the fact of their being stationed above recesses or reliefs.

Still a further action taking place is the elimination of pieces of scale and other fragmentary material from the space between the side faces of the anvil and the cutters. As is indicated above, such fragmentary material derives from the disintegration of the materials processed, the peeling off of coating materials which may be present, as in the case of galvanized iron, or the loosening of scale or other substance which may be present on the surface of the material. This matter collects principally in the recesses provided on either side of the anvil, either by having the side faces of the anvil recessed, or by employing cutting elements the inner faces of which are concave in shape. As the cutting elements rotate, this matter automatically is eliminated from the die. There thus is prevented the accumulation of residual and foreign material which would crowd the cutting elements outwardly to a position in which the cutting edges would not register with the cutting edges of the punch.

I claim:

1. A die for forming stitch fastenings comprising a body portion, an anvil portion having a work surface, one side surface substantially normal to the work surface and an opposite side surface disposed angularly inwardly toward said one side surface; and a cutter resiliently mounted on each side surface, the cutting edge of each cutter extending above said work surface.

2. A die for forming stitch fastenings comprising a body portion, a transversely apertured anvil portion having a work surface, one side surface substantially normal to the work surface, and an opposite side surface disposed angularly inwardly toward said one side surface; a pair of transversely apertured cutters disposed one against each of said side surfaces with the apertures in the cutters and in the anvil portion in substantial alignment, a spring disposed against the outer face of one of the cutters and having therein an aperture in substantial alignment with the apertures in the anvil portion and in the cutters, and a shaft having securing means on each of its ends and extending through all of the apertures, in the anvil portion, the cutters and the spring, the shaft being slidable within said apertures, thereby mounting each of the cutters on the shaft yieldably in a lateral direction.

3. A die for forming stitch fastenings comprising a body portion, an anvil portion having a work surface, one side surface substantially normal to the work surface and an opposite side surface disposed angularly inwardly toward said one side surface; and a pair of cutters pivotally and resiliently mounted one on each side surface of said anvil portion, said cutters having surfaces adjacent their cutting edges disposed angularly outwardly toward the plane of said work surface.

4. A die for forming stitch fastenings comprising a body portion, a transversely apertured anvil portion having a work surface, one side surface substantially normal to the work surface and an opposite side surface disposed angularly inwardly toward said one side surface; a pair of transversely apertured cutters pivotally and resiliently mounted one on each side surface of the anvil portion, each of the cutters having a surface adjacent its cutting edge disposed angularly outwardly toward the plane of said work surface, the apertures in the cutters and in the anvil portion being in substantial alignment, a spring disposed against the outer face of one of the cutters and having therein an aperture in substantial alignment with the apertures in the anvil portion and in the cutters, and a shaft having securing means on each of its ends and extending through all of the apertures in the anvil portion, the cutters and the spring, the shaft being slidable within the apertures, thereby mounting each of the cutters on the shaft yieldably in a lateral direction.

IVAN A. WILLIAMS.

REFERENCES CITED

The following references are of record in the file of this patent:

UNITED STATES PATENTS

| Number | Name | Date |
|---|---|---|
| 173,732 | Matthews | Feb. 22, 1876 |
| 1,492,347 | Beisser | Apr. 29, 1924 |
| 1,496,227 | Jewell | June 3, 1924 |
| 1,646,145 | Gray | Oct. 18, 1927 |
| 1,900,032 | Worthington | Mar. 7, 1933 |
| 2,088,978 | Serra | Aug. 3, 1937 |
| 2,228,779 | Pavlecka et al. | Jan. 14, 1941 |
| 2,254,558 | Williams | Sept. 2, 1941 |
| 2,288,308 | Williams | June 30, 1942 |